United States Patent
Bert

(10) Patent No.: US 11,809,361 B1
(45) Date of Patent: Nov. 7, 2023

(54) NETWORK DATA STORAGE DEVICES HAVING EXTERNAL ACCESS CONTROL

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/866,349

(22) Filed: Jul. 15, 2022

(51) Int. Cl.
  *G06F 3/06* (2006.01)
  *G06F 13/40* (2006.01)
  *G06F 13/16* (2006.01)

(52) U.S. Cl.
  CPC ........ *G06F 13/409* (2013.01); *G06F 13/1668* (2013.01); *G06F 13/4022* (2013.01)

(58) Field of Classification Search
  None
  See application file for complete search history.

(56) References Cited

U.S. PATENT DOCUMENTS

| | | | |
|---|---|---|---|
| 6,766,359 B1 | 7/2004 | Oliveira et al. | |
| 9,432,484 B1 | 8/2016 | Xie et al. | |
| 9,514,080 B1 | 12/2016 | Chang | |
| 9,537,953 B1 | 1/2017 | Dadashikelayeh et al. | |
| 10,664,217 B1 * | 5/2020 | Laha ..................... | G06F 3/1423 |
| 10,984,044 B1 | 4/2021 | Batsakis et al. | |
| 11,106,734 B1 | 8/2021 | Batsakis et al. | |
| 11,436,194 B1 | 9/2022 | Salmon et al. | |
| 11,650,868 B2 * | 5/2023 | Jha ...................... | G06F 9/542 |
| | | | 719/313 |
| 2005/0240745 A1 | 10/2005 | Iyer et al. | |
| 2006/0026229 A1 * | 2/2006 | Ari ...................... | G06F 12/0888 |
| | | | 711/113 |
| 2010/0005234 A1 * | 1/2010 | Ganga .................. | G06F 13/102 |
| | | | 711/105 |
| 2010/0095073 A1 * | 4/2010 | Caulkins ............. | G06F 12/0866 |
| | | | 711/E12.002 |

(Continued)

FOREIGN PATENT DOCUMENTS

WO  2023020055  2/2023

OTHER PUBLICATIONS

U.S. Appl. No. 17/866,276, filed Jul. 15, 2022.

(Continued)

*Primary Examiner* — Hyun Nam
(74) *Attorney, Agent, or Firm* — Greenberg Traurig

(57) ABSTRACT

A storage product manufactured as a computer component to facilitate network storage services. The storage product has no central processing unit. The storage product has a bus connector connectable to a computer bus. An external processor connected to the computer bus can operate as a central processing unit. The storage product has a random-access memory, a network interface, a processing device, and a storage device having a storage capacity accessible via the network interface. The bus connector provides the processor with access to the random-access memory. The processing device of the storage product can identify and separate, among messages received by the network interface, first messages for processing by the external processor and second messages for processing by the storage device.

20 Claims, 7 Drawing Sheets

(56) References Cited

U.S. PATENT DOCUMENTS

| | | | |
|---|---|---|---|
| 2011/0246823 A1* | 10/2011 | Khan | G06F 11/1438 |
| | | | 714/E11.023 |
| 2012/0278396 A1 | 11/2012 | Vuong | |
| 2012/0311271 A1* | 12/2012 | Klein | G06F 12/0873 |
| | | | 711/141 |
| 2014/0282613 A1 | 9/2014 | Jea et al. | |
| 2018/0217951 A1 | 8/2018 | Benisty et al. | |
| 2019/0044879 A1 | 2/2019 | Richardson et al. | |
| 2019/0340024 A1 | 11/2019 | Brewer | |
| 2020/0186445 A1 | 6/2020 | Govindaraju et al. | |
| 2020/0226077 A1 | 7/2020 | Kang et al. | |
| 2022/0121587 A1 | 4/2022 | Kragel et al. | |
| 2022/0245082 A1 | 8/2022 | Vijayashekar et al. | |

OTHER PUBLICATIONS

U.S. Appl. No. 17/866,300, filed Jul. 15, 2022.
U.S. Appl. No. 17/866,318, filed Jul. 15, 2022.
U.S. Appl. No. 17/866,339, filed Jul. 15, 2022.
U.S. Appl. No. 17/866,353, filed Jul. 15, 2022.
U.S. Appl. No. 17/866,357, filed Jul. 15, 2022.
U.S. Appl. No. 17/866,358, filed Jul. 15, 2022.
U.S. Appl. No. 17/866,355, filed Jul. 15, 2022.
U.S. Appl. No. 17/866,350, filed Jul. 15, 2022.
U.S. Appl. No. 17/866,348, filed Jul. 15, 2022.
U.S. Appl. No. 17/866,341, filed Jul. 15, 2022.
U.S. Appl. No. 17/866,336, filed Jul. 15, 2022.
U.S. Appl. No. 17/866,333, filed Jul. 15, 2022.
U.S. Appl. No. 17/866,312, filed Jul. 15, 2022.

* cited by examiner

NETWORK DATA STORAGE DEVICES HAVING EXTERNAL ACCESS CONTROL

TECHNICAL FIELD

At least some embodiments disclosed herein relate to memory systems in general, and more particularly, but not limited to memory systems configured to service data access requests received over computer networks.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
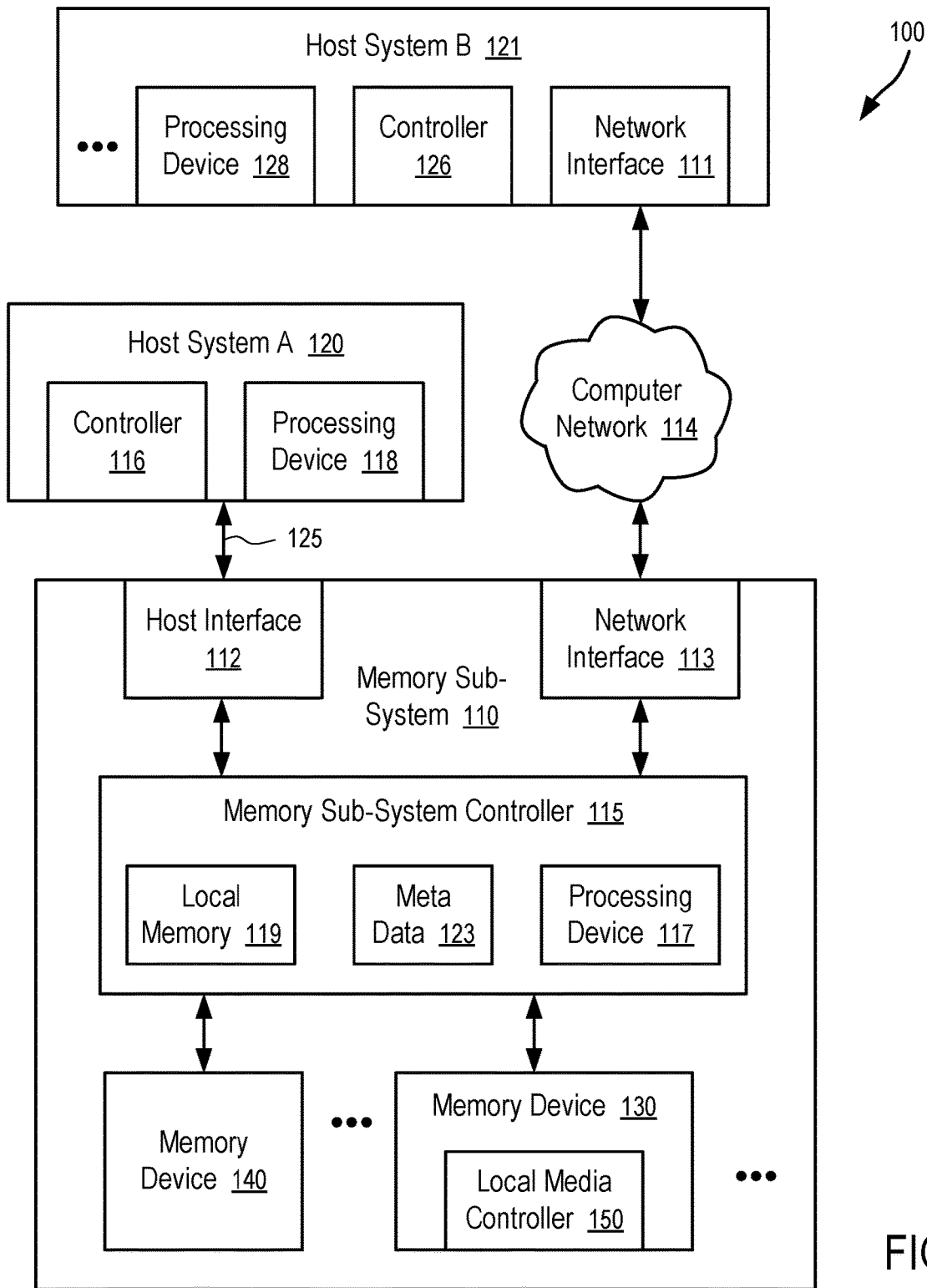
FIG. 1 illustrates an example computing system having a memory sub-system in accordance with some embodiments of the present disclosure.

At least some aspects of the present disclosure are directed to a memory sub-system configured with different processing paths for control messages and data messages. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional network-attached storage device is typically configured as a computing device having a central processing unit (CPU), a random-access memory, a network interface, and one or more memory devices to provide a storage capacity accessible over a computer network. The CPU is typically configured to run an operating system and/or a storage application to provide storage services in response to communications received in the network interface. Communications received in the network interface from a remote host system can include control messages and data messages. The messages are generated by the remote host system to manage and/or access the storage capacity of the network-attached storage device. The instructions executed in the CPU can be programmed to process the control messages and the data messages as input from the remote host system. In response to the messages, the CPU is configured via the instructions to authenticate users, manage access privileges and security settings, authorize access, manage the storage capacity, store data into the memory devices, retrieve data from the memory devices, etc.

For example, the control messages and the data messages received via the network interface of the conventional network-attached storage device are buffered in the random-access memory. The CPU is configured to fetch the messages, process the messages, and send corresponding messages to a local storage device, such as a solid-state drive. The solid-state drive can receive messages, execute the commands in the messages to store data, retrieve data from the memory devices, send retrieved data to the CPU, etc. The CPU can send the retrieved data to the network interface for transmission through a computer network to the remote host system.

Thus, in the conventional network-attached storage device, messages received in the network interface, including control messages and data messages, flow from the network interface through the CPU towards the storage capacity. Access responses, such as data retrieved in response to the read requests/commands, flow through the CPU for transmission by the network interface into the computer network.

However, it is inefficient to flow data messages through the CPU; and the CPU can be a bottleneck in processing power and communication bandwidth in scaling up storage capacity.

At least some aspects of the present disclosure address the above and other deficiencies by using different processing paths for control messages and data messages.

For example, a computing device providing network storage services can be configured with a storage device (e.g., a solid-state drive (SSD), a flash memory device, a ball grid array (BGA) SSD), a processing device (e.g., a microprocessor, a CPU), and a network interface connected to a remote host system as a storage client. The storage client (e.g., the network interface receiving messages from the remote host system) can write data into the storage device and retrieve data from the storage device. The storage client is configured to provide data messages to the storage device without going through the processing device. Control messages, such as administrative commands and management commands, are routed through the processing device. Instructions executed in the processing device are configured/programmed to process the control messages to exercise access control, to exercise security control, and to perform administrative operations.

For example, to reduce the burden on the CPU and improve efficiency, the computing device can be configured with different processing paths for certain control messages and other messages.

For example, the control messages on a separate processing path can include administrative and management commands used to create a namespace in the storage capacity, to map the namespace to a client, to authenticate users, to set security attributes (e.g., read only permitted vs. both read and write permitted), to provide authorization to which operation is allowed, to manage configuration changes, etc. Such control messages (e.g., for administrative and management functions) can be configured to flow through the processing device; and the processing device is configured via programmed instructions and/or other data to process the control message. Instructions executed in the processing device can be programmed to perform access control, administrative operations, management operations, etc., without operating on the data to be stored into and/or the data being retrieved from the storage device. Other messages, such as data messages containing write commands and data to be written into the storage device according to the write commands, read commands, data retrieved in response to the read commands, etc., can be configured to be communicated between the storage device and the storage client without going through the processing device.

As a result, the power consumption of the computing device can be reduced; the requirement on the communication bandwidth through the processing device (e.g., a microprocessor, a CPU) can be reduced; and the requirement on the computing power on the processing device can be reduced.

In contrast, a traditional network-attached storage device is configured to flow data messages through a CPU. In typical usages, administrative and management commands are only a small portion of messages, the data messages can be the majority of the messages going through in the network interface. Thus, the processing of the data messages by the CPU in the traditional network-attached storage device can place a very high weight on the CPU (e.g., lot of commands to process) and the random-access memory (e.g., lot of data buffering).

When data messages are communicated from a storage client to a storage device without going through the processing device (e.g., a microprocessor, a CPU) of the computing device, according to the present disclosure, the processing device is tasked to process a very small portion of messages (e.g., administrative and management commands, which are less than 0.1% of total commands). Other messages (e.g., more than 99.99% of total commands), including both command parts and data parts, can be routed to the storage device without going through the processing device. As a result, a less powerful processing device can be used to control and manage the storage; and the storage capacity can be easily scaled up by the processing device controlling multiple units, each containing a network interface and one or more local storage devices, as further discussed below.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 140), one or more non-volatile memory devices (e.g., memory device 130), or a combination of such.

In FIG. 1, the memory sub-system 110 is configured as a product of manufacture, usable as a component installed in a computing device. The memory sub-system 110 has a network interface 113 controlled by a memory sub-system controller 115 to communicate with a remote host system 121 over a computer network 114.

For example, the remote host system 121 can be configured with a processing device 128 (e.g., a microprocessor, a CPU), a memory controller 126, a network interface 111, and other components (e.g., random-access memory, sensors, and/or user interfaces). Instructions executed in the processing device 128 can be programmed to use the network interface 111 to access the storage capacity of the memory sub-system 110 using a storage protocol, such as internet small computer systems interface (iSCSI), fibre channel (FC), fibre channel over ethernet (FCoE), network file system (NFS), and server message block (SMB), or another protocol.

The memory sub-system 110 further includes a host interface 112 for a computer memory bus or a computer peripheral bus 125 connectable to a local host system 120 having a memory controller 116 and a processing device 118.

For example, instructions executed in the local host system 120 can be programmed to control, through the bus 125, the memory sub-system 110 according to serial advanced technology attachment (SATA), peripheral component interconnect express (PCIe), universal serial bus (USB), fibre channel (FC), serial attached SCSI (SAS), double data rate (DDR), small computer system interface (SCSI), open NAND flash interface, low power double data rate (LPDDR), non-volatile memory (NVM) express (NVMe), compute express link (CXL), or another technique.

Thus, a combination of the local host system 120 and the memory sub-system 110 can be used as a network-attached data storage device providing storage services to the remote host system 121 through the network interface 113 using a storage capacity of the memory devices 130, . . . , 140.

For example, the processing device 118 can be a microprocessor configured as a CPU of a computing device functioning a network-attached data storage device. The local host system 120 can be connected to one or more of the memory sub-systems (e.g., 110) via a peripheral bus 125. To scale up the storage capacity of the network-attached data storage device, more memory sub-systems (e.g., 110) can be connected to the local host system 120, with their respective network interfaces (e.g., 113) being connected to the computer network 114 and/or other computer networks.

Although FIG. 1 illustrates an example of one remote host system 121 connected to the network interface 113, multiple remote host systems (e.g., 121) can be configured on the computer network 114 to access the storage services of the network-attached storage device. Access to the storage services can be controlled via user credentials, host attributes, network addresses, and/or security settings, etc.

To reduce the burden on the local host system 120, at least a portion of control messages, among the messages received via the network interface 113 from the computer network 114 (e.g., from the remote host system 121), can be separated in the memory sub-system 110 from other types of messages, such as data messages. The memory sub-system 110 is configured to provide the control messages through the host interface 112 to the local host system 120 for processing without providing other messages, such as data messages, to the host interface 112, as discussed further below.

For example, network packets received in the network interface 113 can be processed by the memory sub-system controller 115 to recover or generate control messages and data messages. The memory sub-system controller 115 can include local memory 119 (e.g., random-access memory) and a processing device 117 configured to at least process the network packets from the network interface 113. The memory sub-system controller 115 can buffer the control messages in the local memory 119 for processing by the local host system 120; and the local host system 120 can place processing results in the local memory 119 for execution. The execution of the control messages processed by the local host system 120 can generate meta data 123 that control the storage operations performed for data messages. The controller 115 can be configured to execute the commands of the data messages based on the meta 123 to store data into the memory devices 130, ..., 140, to retrieve data from the memory devices 130, ..., 140, and to transmit the retrieved data to the remote host system 121 using the network interface 113.

In some implementations, a memory device 130 can be a solid-state drive (e.g., a BGA SSD). Thus, the memory sub-system controller 115 can process and/or forward commands as processed by the local host system 120 and other commands to operate the memory device 130.

In some implementations, a portion of the memory sub-system controller 115 and at least a portion of the memory devices 130, ..., 140 are configured as a conventional storage device (e.g., SSD); and a remaining portion of the memory sub-system controller 115 can forward commands to the storage device for execution. Thus, a conventional storage device (e.g., SSD) can be used as a component or a local storage device in implementation of the memory sub-system 110.

In some implementations, multiple portions of the memory sub-system controller 115 and the memory devices 130, ..., 140 can be configured as multiple conventional storage devices (e.g., SSDs). In other implementations, the processing device 117 is shared by the memory devices 130, ..., 140 without being configured according to a conventional storage device (e.g., SSD). Thus, the configuration of the memory sub-system controller 115 and memory devices 130, ..., 140 are not limited to a particular connectivity and/or topology.

Bypassing the local host system 120 in the processing of the data messages greatly reduces the workloads of the local host system 120. Thus, the local host system 120 can be used to control multiple memory sub-systems (e.g., 110) in expanding storage capacity.

Since the memory sub-system 110, as a product, is configured to specifically service the storage access requests received via the network interface 113, the processing and communication bandwidth within the memory sub-system 110 can be designed and tailored according to the communication bandwidth of the network interface 113. Products similar to the memory sub-system 110 can be used as building blocks of a network storage facility controlled by the local host system 120. The capacity of the network storage facility can be easily scaled up via connecting more units to the computer network 114. Since the workload of the local host system 120 and communications to the local host system 120 are very low for controlling each memory sub-system 110, many memory sub-systems (e.g., 110) can be connected to the local host system 120 to scale up the capacity of the network storage facility without being limited by the communication bandwidth and/or processing power of an available local host system 120.

Figure 2:
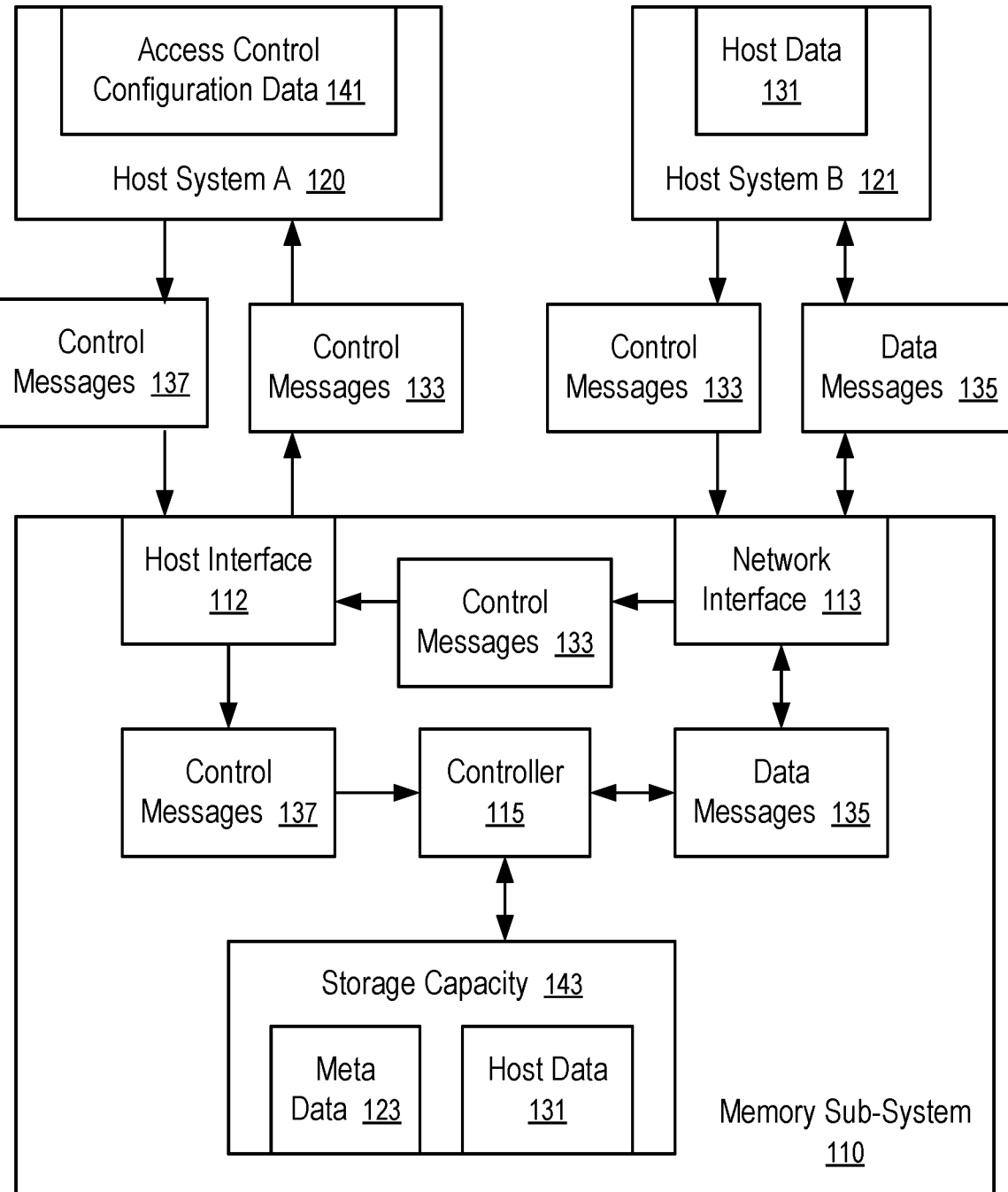
FIG. 2 shows different paths for processing control messages and data messages in a memory sub-system according to one embodiment.

FIG. 2 shows different paths for processing control messages and data messages in a memory sub-system according to one embodiment.

For example, the processing paths of FIG. 2 can be implemented using a memory sub-system 110 of FIG. 1 and/or the computing system 100 of FIG. 1.

In FIG. 2, a remote host system 121 is connected (e.g., over a computer network 114 as in FIG. 1) to the network interface 113 of the memory sub-system 110. The remote host system 121 can store host data 131 into the storage capacity 143 of the memory sub-system 110, and retrieve the host data 131 back from the memory sub-system 110, using a storage protocol, such as internet small computer systems interface (iSCSI), fibre channel (FC), fibre channel over ethernet (FCoE), network file system (NFS), and server message block (SMB), or another protocol.

Using the storage protocol, the remote host system 121 can send control messages 133 to the memory sub-system 110 to manage and/or administrate the storage capacity. For example, the host system can sign into the memory sub-system to start a session and/or a read/write operation. The control message 133 can include a command to generate a namespace in the storage capacity 143, to create, delete, open, or close a file in the namespace, to set security attributes (e.g., which files are readable and/or writable by which users), etc.

The control messages 133 received via the network interface 113 are forwarded to the host interface 112 connected to the local host system 120 for processing. Processed control messages 137 are provided to the controller 115 of the memory sub-system 110. Execution of commands/requests in the processed control messages 137 can generate meta data 123 that controls the data storage operations of the memory sub-system 110.

Some of the control messages 133 can be used to generate access control configuration data 141, such as identifications of user accounts, access privileges, user credentials, etc.

Optionally, the local host system 120 connected to the memory sub-system 110 can provide a user interface. An administrator can use the user interface to generate control messages 137 to perform administrative and/or management operations, such as creating accounts, record or change access credentials, generate namespaces, etc. At least a portion of the access control configuration data 141 can be generated via the user interface.

The access control configuration data 141 can be stored in part in the memory sub-system 110, or in another storage device connected to the local host system 120.

Subsequently, when the remote host system 121 sends a control message 133 for authentication or access, the local host system 120 can receive the control message 133 and use the access control configuration data 141 to determine whether to permit the access. If the request is permitted, the local host system 120 can send a control message 137 to the controller 115 of the memory sub-system to set up access. For example, in response to the control message 137, the controller 115 can set up a channel to the storage capacity. For example, the channel can include one or more queues in the local memory 119 for the read/write operations permitted by the control message 137. In some implementations, the channel can further include a portion of the meta data 123 generated to facilitate the read/write operations (e.g., for address translation).

To write host data 131 into the memory sub-system 110, the remote host system 121 can transmit a data message 135 containing a write command and data to be stored. In response to the data message 135, the controller 115 can write the received data into the storage capacity using the channel set up for the operation of the remote host system 121. Thus, the data message 135 is not routed to the local host system 120. Bypassing the local host system 120 in routing the data message 135 prevents the local host system 120 from accessing the host data 131 in the data message 135. Thus, the security for the host data 131 is improved.

To access the host data 131 stored in the memory sub-system 110, the remote host system 121 can send a data message 135 containing a read command. In response to the read command in the data message 135, the controller 115 can use the channel set up for the operation of the remote host system 121 to retrieve the host data 131 and generate a response in the form of a data message 135. The data message 135 is transmitted back to the remote host system 121 using the network interface 113 without going through the host interface 112. Thus, the local host system 120 does not have access to the host data 131 retrieved from the storage capacity 143, which also improves security for the host data 131.

Thus, by separating control messages 133 for routing into the local host system 120, only a very tiny portion of messages communicated between the remote host system 121 and the network interface 113 is routed through the local host system 120. Thus, the requirements on processing power and communication bandwidth on the local host system 120 are drastically reduced, while allowing the local host system 120 to exercise control over security, administrative, and management operations of the memory sub-system 110. The reduction makes it easy to scale up the storage capacity controlled by the local host system 120. For example, multiple memory sub-systems (e.g., 110) can be connected over a computer bus or a peripheral bus 125 to the local host system 120, while the memory sub-systems (e.g., 110) are separately connected to one or more computer networks (e.g., 114) via their respective network interfaces (e.g., 113).

In some implementations, the network interface 113 includes a logic circuit, a controller, and/or a processor configured to recover, identify, determine, or generate the control messages 133 and the data messages 135 from data packets received from a computer network 114.

In some other implementations, the processing power of the controller 115 is used to convert network packets received in the network interface 113 into the control messages 133 and the data messages 135. The controller 115 can include a processor configured with instructions to generate the control messages 137 and the data messages 135.

Figure 3:
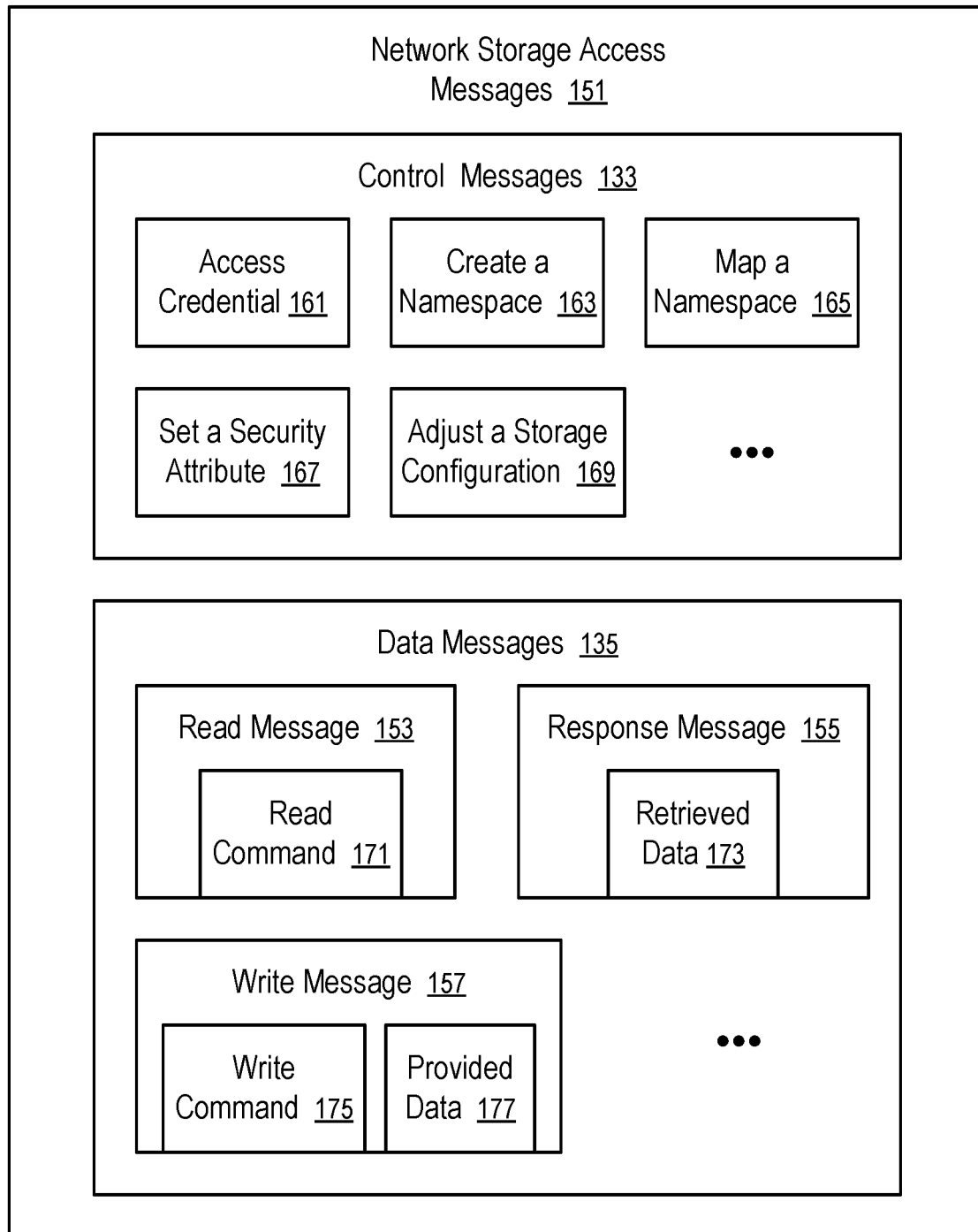
FIG. 3 shows a configuration of control messages and data messages for processing in a memory sub-system according to one embodiment.

FIG. 3 shows a configuration of control messages and data messages for processing in a memory sub-system according to one embodiment.

For example, the separation of control messages 133 and data messages 135 for routing in different processing paths in FIG. 2 can be implemented according to the configuration of FIG. 3.

Network storage access messages 151 communicated between a remote host system 121 and the network interface 113 of a memory sub-system 110 can be partitioned into control messages 133 and data messages 135 as illustrated in FIG. 3.

The control messages 133 can include a message containing access credential 161 to start a session or an operation.

The control messages 133 can include a message containing a command to create a namespace 163 in the storage capacity 143.

The control messages 133 can include a message containing a command to map a namespace 165 in the storage capacity 143.

The control messages 133 can include a message containing a command to set a security attribute 167 in the storage capacity 143 (e.g., a read permission for a user, a write permission for a user).

The control messages 133 can include a message containing a command to adjust a storage configuration 169 (e.g., move a file).

The control messages 133 can include other commands that can change meta data 123 in the memory sub-system 110 to control and organize host data 131. However, the control messages 133 do not include host data 131 to be written into the memory sub-system 110 and/or host data 131 being read from the memory sub-system 110.

The data messages 135 can include a read message 153 having a read command 171 (and an address of data to be read), a response message 155 having data 173 retrieved from the storage capacity 143, a write message 157 having a write command 175 and provided data 177 to be written into the storage capacity 143, a message having a trim or deallocation command, etc.

The control messages 133 are routed through the host interface 112 of the memory sub-system 110, but the data messages 135 are not routed through the host interface 112 of the memory sub-system 110. In some implementations, network storage access messages 151 received for the network interface 113 in one storage protocol is converted to control messages 133 and data messages 135 in another protocol for a local storage device (e.g., a solid-state drive, a memory device 130).

In one aspect, a method is provided to process network messages to access storage of a memory sub-system according to one embodiment.

For example, the method can be performed by a storage manager configured in a memory sub-system 110 and/or a local host system 120 of FIG. 1 to have different processing paths illustrated in FIG. 2 using a configuration of FIG. 3. For example, a storage manager in the memory sub-system 110 can be implemented to perform operations discussed in connection with the memory sub-system 110; and the storage manager can be implemented via a logic circuit and/or a processing device 117 of the memory sub-system controller 115, and/or instructions programmed to be executed by the processing device 117. For example, a storage manager in the local host system 120 can be implemented to perform operations discussed in connection with the local host system 120; and the storage manager can be implemented via a logic circuit and/or a processing device 118 of the host system 120, and/or instructions programmed to be executed by the processing device 118.

In the method, a network interface 113 of a memory sub-system 110 receives, over a computer network 114, packets from a remote host system 121.

For example, the memory sub-system 110 can have a storage device, such as a memory device 130, a solid-state drive having one or more memory devices 130, . . . , 140 to provide a storage capacity 143 accessible to the remote host system 121 over a computer network 114. The memory sub-system 110 can have a host interface 112 operable on a peripheral bus 125 connected to a local host system 120 to process a portion of network storage access messages 151 generated from the packets. The memory sub-system 110 can have a storage manager (e.g., implemented via a controller 115 coupled to the host interface 112, the network interface 113, and the solid-state drive).

In the method, the memory sub-system 110 determines (e.g., using a storage manager), from the packets, first control messages 133 and first data messages 135 that include first host data 131 provided by the remote host system 121.

For example, the remote host system 121 can access the storage functions of the memory sub-system 110 using a storage protocol, such as internet small computer systems interface, fibre channel, fibre channel over ethernet, network file system, or server message block, or another protocol. The first control messages 133 and first data messages 135 can be determined from the messages transmitted by the remote host system 121 using the storage protocol. In some implementations, the first control messages 133 and first data messages 135 are recovered from the packets received at the network interface 113. In some implementations, the messages transmitted from the remote host system 121 are translated to a protocol for accessing the solid-state drive.

In the method, the memory sub-system 110 sends (e.g., using the storage manager), through a host interface 112 of the memory sub-system 110, the first control messages 133 to a local host system 120.

For example, the host interface 112 can be configured according to a computer peripheral bus 125 according to serial advanced technology attachment, peripheral component interconnect express, universal serial bus, fibre channel, serial attached small computer system interface, double data rate, small computer system interface, open NAND flash interface, low power double data rate, non-volatile memory express, or compute express link, or another computer bus technique.

In the method, the local host system 120 processes (e.g., via a storage manager), the first control messages 133 to generate second control messages 137.

In the method, the memory sub-system 110 receives (e.g., via its storage manager), via the host interface 112 from the local host system 120, the second control messages 137 responsive to the first control messages 133.

In the method, the memory sub-system 110 processes (e.g., via its storage manager), the second control messages 137 and the first data messages 135, without sending the first data message 135 and/or the first host data 131 to the local host system 120, to write the first host data 131 into a memory device 130 of the memory sub-system 110.

For example, the first data messages 135 can include a write command 175; and the first host data 131 (e.g., provided data 177) can be written into a memory device (e.g., 130) of the memory sub-system according to the write command without the write command 175 and/or its data 177 going through the host interface 112.

For example, the first data message 135 can include a read command 171. In response, the memory sub-system 110 can read second host data (e.g., data 173) from the solid-state drive and/or a memory device (e.g., 130) according to the read command 171 specified in the first data messages 135. The memory sub-system 110 generates second data messages (e.g., response message 155) containing the second host data (e.g., data 173). The memory sub-system 110 transmits, via the network interface 113, the second data messages (e.g., response message 155) to the remote host system 121 without the second host data (e.g., retrieved data 173) and/or the second data messages (e.g., response message 155) going through the host interface 112.

For example, the memory sub-system 110 can be configured to process the second control messages 137 to generate meta data 123 according to which the first host data 131 is written into the solid-state drive (e.g., the memory device 130) and the second host data (e.g., data 173) is retrieved from the solid-state drive (e.g., the memory device 130).

For example, the first control messages include a command (e.g., create a namespace 163, map a namespace 165) to create, map, or delete a namespace; and the meta data 123 is associated with the namespace.

For example, the memory sub-system 110 can be configured to process the second control messages 137 to set up a channel to write the first host data 131 or read the second host data (e.g., data 173).

For example, the memory sub-system 110 can have random-access memory (e.g., memory 119); and the channel can include one or more queues configured, according to the second control messages, for writing data into, and/or retrieving data from, the solid-state drive.

For example, the channel can be configured with data used by the controller 115 of the memory sub-system 110 to perform address translation to write the first host data 131 into the solid-state drive.

For example, the first control messages 133 include a credential 161 to access a storage capacity 143 of the solid-state drive. The local host system 120 can validate the credential 161 based on access control configuration data 141.

For example, the first control messages 133 include a command to set a security attribute 167, and/or a command to adjust a storage configuration 169 in the solid-state drive.

The local host system 120 is configured to process the first control message 133 to exercise security control and perform administrative operations.

In at least some embodiments, a memory sub-system 110 as in FIG. 1 and/or FIG. 2 can be configured as a storage product. Such a storage product has a network interface 113 to communicate with one or more remote host systems (e.g., 121) to provide network storage services. However, the storage product is not configured with a central processing unit and thus inoperable standalone. Instead, the storage product is configured with an interface (e.g., host interface 112) to an external processor (e.g., processing device 118). When connected to the storage product, the external processor can function as a central processing unit. The central processing unit can be configured with an operating system and/or a storage service application to control at least some of the operations in the memory sub-system 110.

For example, the external processor can be configured to process the control messages 133 received in the network interface 113. The processing can be performed in view of access control configuration data 141 to control security and administer the network storage services.

Optionally, the external processor can further receive other control messages (e.g., from a user interface configured in the local host system 120) that do not go through the network interface 113.

The storage product is configured with sufficient resources to perform network operations and storage operations without assistance from the external processor. For example, when allowed, operations requested via the data messages 135 received in the network interface 113 can be performed by the storage product without assistance from the external processor. For example, the storage product itself has sufficient resources to convert between network packets and network storage access messages 151, perform operations to store or retrieve data, and perform other storage operations, such as address translation, wear leveling, garbage collection, error detection and correction, etc.

The external processor can execute instructions programmed to perform access control, administer network storage services, and/or manage storage configuration. Commands for administrative operations can be received in a local user interface without going through a network interface (e.g., 113). Alternatively, or in combination, a remote host system (e.g., 121) can send commands to the network interface (e.g., 113) to request the administrative operations. Thus, the external processor can exercise control over data manipulation operations within the storage product.

Such a storage product can be designed to optimize performance and cost based on the communication bandwidth of the network interface 113. The network communication bandwidth substantially defines the workloads of the components with the storage product. Thus, the storage product can be manufactured and provided as a computer component usable as a storage building block. A storage system can be built using one or more such storage products connected to a same external processor. The storage capacity of the storage system can be easily scaled up by using more storage products connected to the storage system with their network interfaces being separately connected to one or more computer networks. Since the workload of the external processor is light, the processing power and communication bandwidth of the external processor are not likely to be a bottleneck in practical applications.

In contrast, a conventional network attached storage device does not have an interface for an external processor. Such a conventional storage device is entirely responsible for the processing of the messages and data received at its network interface. Access control and security are implemented via its firmware. Maintaining security of such firmware can be a challenge. There is no mechanism in a conventional network attached storage device to apply control and administration without going through the network interface of the storage device.

When a storage product has an interface for an external processor, control and administrative operations can be performed via the external processor without going through the network interface of the storage product for improved security. Instead of relying solely upon the firmware of the storage product to handle security and administrative operations through the network interface, a storage system implemented using the storage product can use software running the external processor of the storage product to apply security control and perform administrative operations. Further, security measures can be implemented in both the firmware of the storage product and the software running in the external processor; and such an arrangement can improve security by increasing the difficulties for gaining unauthorized access.

Further, the storage product can be configured to bypass the external processor in processing the data messages 135 that contains host data 131 (e.g., as in FIG. 2). Thus, the host data 131 is protected against security breaches in the local host system 120. Since the external processor does not have access to the host data 131, unauthorized access to the host data 131 cannot be made via the external processor.

When the storage product (e.g., memory sub-system 110) is connected to an external processor via the host interface 112 of the storage product to form a computing device, the external processor can function as a central processing unit of the computing device. However, the storage product can be configured to provide limited access to the central processing unit.

For example, the central processing unit can be provided with access to control messages 133 specifically identified by the network interface 113 for processing to generate control messages 137 for execution in a storage device within the storage product. However, the central processing unit can be prevented from accessing the network interface 113 directly. For example, the central processing unit can be prevented from using the network interface 113 to transmit messages and/or receive messages other than processing the control messages 133 identified by the network interface 113. Thus, the difficulty for unauthorized access to hack, through the network interface, the system running in the central processing unit is increased; and the risk of the system running in the central processing unit being hacked via a computer network 114 and/or the Internet is eliminated, minimized, or reduced.

Similarly, the controller 115 can limit the access of the external processor to the storage capacity 143. The central processing unit can send control messages 137 without obtaining responses. Responses to read commands are routed to the network interface directly without going through the central processing unit. Further, the storage product can be configured to filter the control messages 137 from the external processor to remove commands other than the commands for security and administration.

For example, after booting up the system running in the central processing unit, the controller 115 can reject or drop messages of the same type as the data messages 135 when the messages are from the central processing unit. Thus, the central processing unit can be prevented from reading the host data 131, and/or writing over or erasing the host data 131.

In some implementations, the storage functions, access control, and administrative operations of the storage product are managed by an external processor connected to the host interface 112 without involving the network interface 113. An administrator can dynamically monitor the activities, update and/or enhance the software executed in the external processor.

For example, a storage application running in the external processor can be programmed to provide a user interface. An authorized administrator can use the user interface to specify access control configuration data 141, such as who has access to what content, which portion of storage capacity (e.g., namespace), what set of resources and capabilities gets exposed, etc. The access commands received at the network interface 113 (e.g., in control messages 133) can be checked against the access control configuration data 141 and/or mapped to appropriate locations in the storage capacity 143. The external processor can set up mapping for access commands/requests received at the network interface 113 (e.g., for read or write operations) from locations as identified by the remote host system 121 into corresponding commands in accessing appropriate locations in the storage capacity 143.

For example, the operation system and/or the storage application running in the external processor can be configured to be only on the control path for security and administration but not on the data path. The data to be written into or retrieved from the storage capacity 143 does not go through the host interface 112 to the external processor. Instead, the computing resources built in the storage product are used to process the data being stored or retrieved. Thus, the communication bandwidth to the external processor, and the computational workload applied to the external processor are small, relative to the data flow into or output from the storage product. As a result, the external processor can be used to control multiple storage data processing units in scaling up the capability in handling large data flows.

Figure 4:
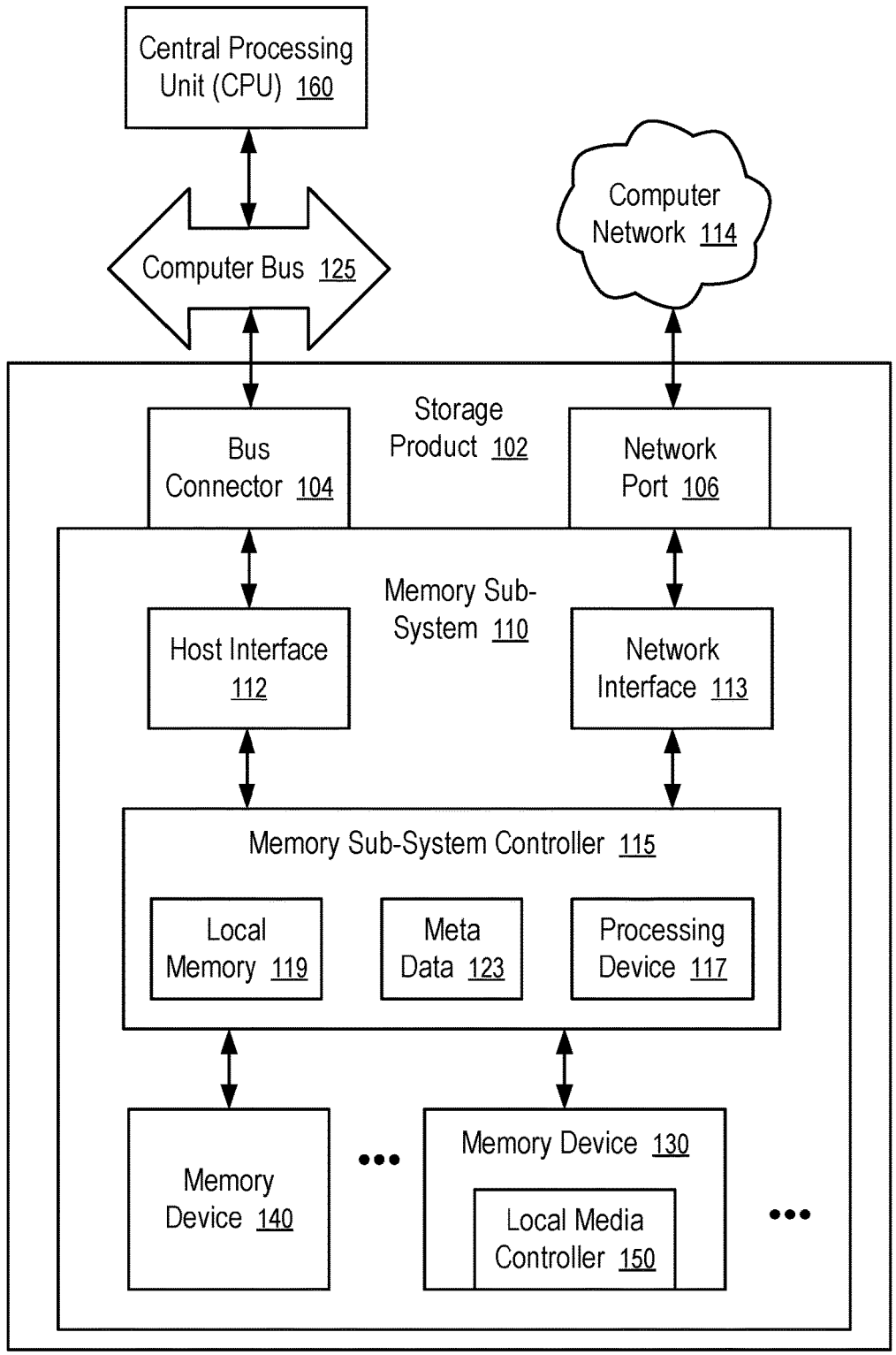
FIG. 4 shows a network-ready storage product configured to have an external processor according to one embodiment.

FIG. 4 shows a network-ready storage product 102 configured to have an external processor according to one embodiment.

For example, the network-ready storage product 102 can be implemented using a memory sub-system 110 of FIG. 1 and/or FIG. 2 configured to have different processing paths for control messages 133 and data messages 135.

In FIG. 4, the storage product 102 includes a memory sub-system 110 (e.g., as in FIG. 1), a bus connector 104 and a network port 106.

The storage product 102 is manufactured without a central processing unit 160. The storage product 102 can be shipped from a manufacturer as a standalone computer component for production or assembling of network storage devices, servers, computers, etc.

A network cable can be inserted into the network port 106 of the storage product 102 for a network connection between a remote host system 121 and the network interface 113 of the storage product 102. In some implementations, the network interface 113 includes a wireless transceiver for a wireless computer network (e.g., a wireless local area network or WiFi network); and the network port 106 includes a connector for an antenna for the transceiver.

The bus connector 104 of the storage product 102 can be connected a computer bus 125. When the storage product 102 is connected via the computer bus 125 to a central processing unit 160, the combination of the central processing unit 160 and the storage product 102 can be a computing device configured to provide at least the services of a typical network attached storage device.

The storage product 102 can be manufactured to include an optional casing or housing that encloses the memory sub-system 110, in a way similar to a solid-state drive, a hard disk drive, an external drive, a network drive, etc. (e.g., as in FIG. 5). In some implementations, the storage product 102 is configured on a printed circuit board (PCB); and a portion of the printed circuit board (PCB) is configured as the bus connector 104 insertable into an expansion slot (e.g., a PCIe slot on a mother board) (e.g., as in FIG. 6). Alternatively, the bus connector 104 can be configured as a port such that a computer cable (e.g., according to PCIe, USB) can be inserted for a connection to the computer bus 125.

The bus connector 104 and the network port 106 provide access to the logic circuits within the storage product 102.

In some implementations, power to operate the memory sub-system 110 is provided via the bus connector 104 or the network port 106. In other implementations, the storage product 102 has a separate power connector to receive power for the operations of the memory sub-system 110.

The storage product 102 offers no other interfaces for accessing its components, and/or for modifying and/or augmenting the hardware of the storage product 102. Thus, the usage of the storage product 102 in constructing computing devices, servers, network storage devices, etc. can be greatly simplified.

In addition to being connected to the bus connector 104 and the central processing unit 160, the computer bus 125 can be further connected to peripheral devices, such as a monitor, a keyboard, a mouse, a speaker, a printer, a storage device storing access control configuration data 141 and/or instructions of an operating system and/or a storage application to be executed in the central processing device, etc.

Some of the peripheral devices can be used to implement a user interface to receive commands to manage the storage capacity 143 of the memory sub-system 110 (e.g., storage quota, storage partition) and/or to manage access control configuration data 141 (e.g., user accounts, access rights, credential).

In some implementation, the access control configuration data 141 are generated and/or configured via the user interface for the network storage services of the storage product 102. Such an arrangement removes the need to configure, adjust, and/or administer the access control configuration data 141 through the network interface 113 over a computer network 114. Thus, the security of the access control configuration data 141 can be improved. To further improve security, the network interface 113 and/or the central processing unit 160 can be configured to reject a portion of the control messages 133 that are received from the computer network 114 and configured to set up or change access control configuration data 141.

Similarly, administrative operations can be performed via the user interface to relieve remote host systems (e.g., 121) from being programmed to perform such operations via a network connection.

The storage capability controlled by the central processing unit 160 can be expanded by connecting, to the computer bus 125, one or more other storage products similar to the storage product 102.

In some implementations, the central processing unit 160 can send, through the computer bus 125, commands to control the operations of at least some of the components configured within the storage product 102. For example, the central processing unit 160 can send commands to start or stop the operation of the network interface 113, manage the network attributes/configuration of the network interface 113, etc. For example, the central processing unit 160 can send commands to the memory sub-system controller 115 to start or stop its operations. For example, the central processing unit 160 can send commands to write data into the local memory 119 and read data from the local memory 119.

Figure 5:
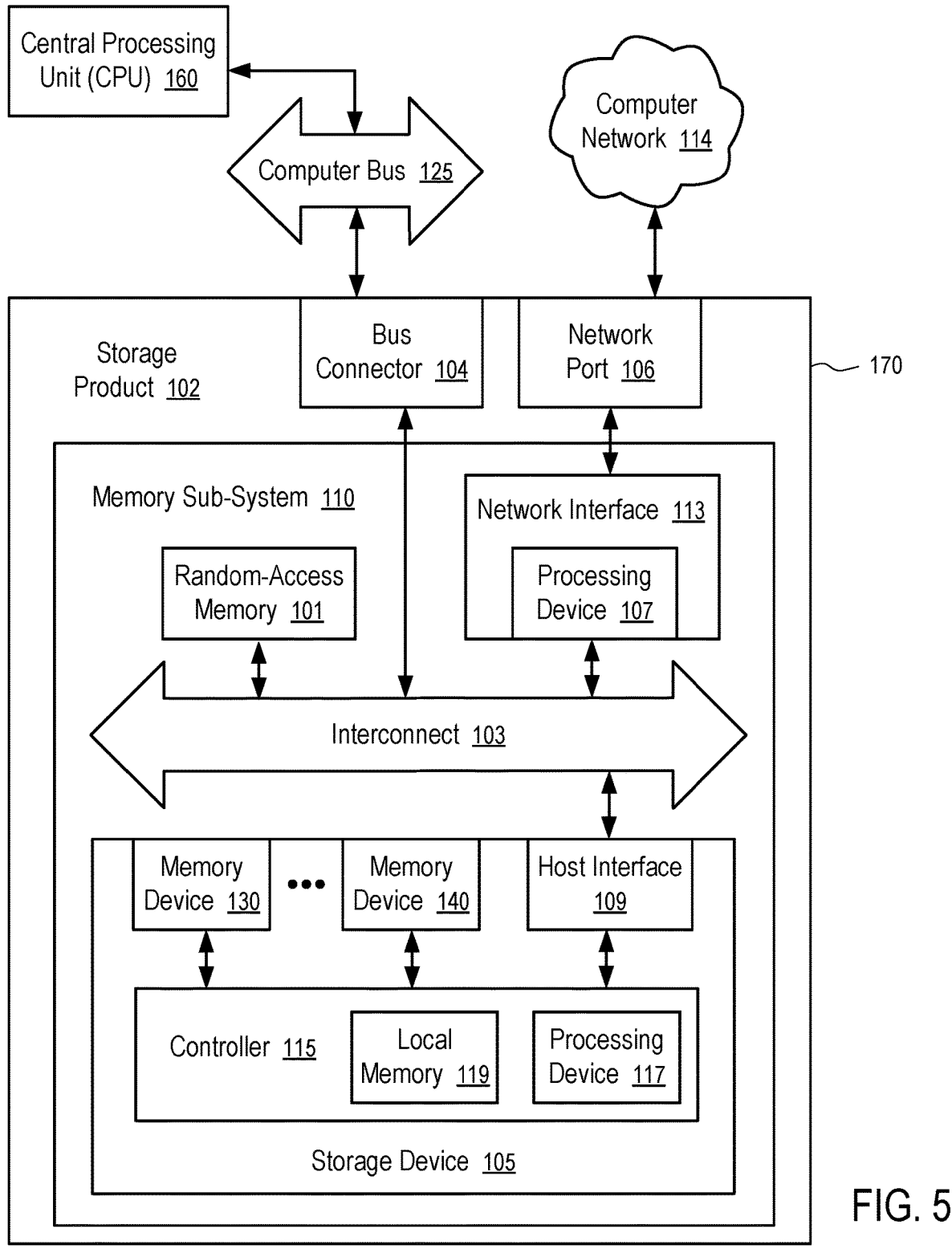
FIG. 5 shows a storage product having a storage device, a network port, and a bus connector to an external processor according to one embodiment.
Figure 6:
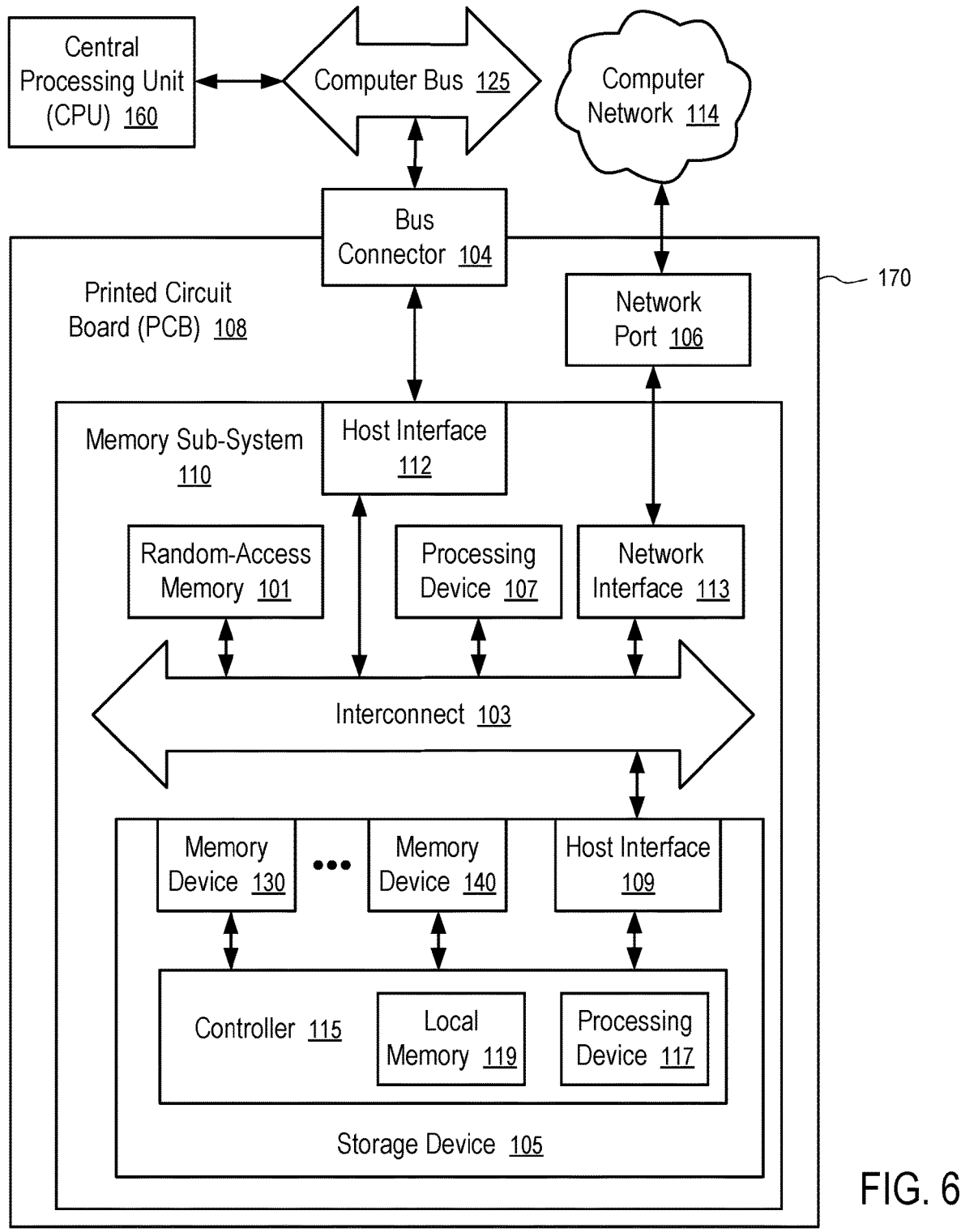
FIG. 6 shows a storage product configured on a printed circuit board according to one embodiment.

In some implementations, at least a portion of the controller 115 and the memory devices 130, . . . , 140 are configured as one or more local storage devices (e.g., solid-state drives) as in FIG. 5 and FIG. 6; and the central processing unit 160 can send to the storage device commands for storage operations, such as create or delete namespaces, read data at specified addresses, write data at specified addresses, erase data at specified addresses, etc.

Optionally, the central processing unit 160 has limited access to the components in the memory sub-system 110. For example, the access can be limited to the receiving of the control messages 133 identified by the network interface 113 and sending the control messages 137 responsive to the control messages 133 or responsive to user inputs specified in the user interface provided via the instructions executed in the central processing unit 160.

FIG. 5 shows a storage product having a storage device, a network port, and a bus connector to an external processor according to one embodiment.

For example, the storage product 102 of FIG. 4 can be implemented in a way illustrated in FIG. 5.

In FIG. 5, the storage product 102 has an interconnect 103 connecting a bus connector 104, a network interface 113, a random-access memory 101, and a storage device 105. For example, the interconnect 103 can be one or more computer buses.

An external processor (e.g., central processing unit 160) can access a portion of the functions or circuits in the storage product 102 via the bus connector 104. The external processor can be programmed via instructions to control operations in the memory sub-system 110.

The random-access memory 101 can be accessible to the central processing unit 160 over a computer bus 125. For example, messages to be processed by the central processing unit 160 and/or messages to be transmitted to the storage device 105 can be buffered in the random-access memory 101. The random-access memory 101 can be implemented using dynamic random-access memory (DRAM), synchronous dynamic random-access memory (SDRAM), static random-access memory (SRAM), three-dimensional crosspoint ("3D cross-point") memory, etc.

The storage device 105 is used to implement the storage capacity 143 of the storage product 102 accessible over a computer network 114. The local storage device 105 can have integrated circuit memory devices 130, . . . , 140 to provide the storage capacity 143. For example, the storage device 105 can be configured as a solid-state drive usable on a computer peripheral bus through its host interface 109. In some implementations, the storage device 105 is a solid-state drive (SSD) or a BGA SSD. In other embodiments, a hard disk drive can be used as the storage device 105.

The storage product 102 can be enclosed in a housing or casing 170 to protect the components of the memory sub-system 110 from tampering. Access to functions of the components within the storage product can be limited to the use of the bus connector 104 and the network port 106. Since the resources of the memory sub-system 110 is designed to be sufficient to handle requests received according to the communication bandwidth of the network interface 113, the storage product 102 does not offer options for a user to customize its hardware (e.g., adding components, removing components, altering connections, etc.).

In some implementations, the network interface 113 includes a wireless transceiver for a wireless network connection; and the network port 106 includes a connector for an antenna.

In FIG. 5, the network interface 113 includes a processing device 107 (e.g., a logic circuit, a controller, or a processor). The processing device 107 of the network interface 113 is configured to process packets received from the computer network 114 and to generate packets for transmitting messages (e.g., response message 155) into the computer network 114.

The processing device 107 of the network interface 113 is further configured to identify and separate messages for the central processing unit 160 and the storage device 105. A portion of messages received in the network interface 113 from the computer network 114 is identified and provided to the central processing unit 160 for processing. For example, control messages 133 are identified and selected for processing by the central processing unit 160 in view of access control configuration data 141. For example, the processing device 107 of the network interface 113 can buffer the messages selected for processing by the central processing unit 160 in the random-access memory 101 (e.g., in one or more queues); and the central processing unit 160 can be configured (e.g., via an operating system and/or a storage application) to retrieve the messages to determine whether to accept or reject the requests in the retrieved messages, whether to transform the retrieved messages, and/or whether to generate new messages for processing by the storage device 105.

The processing device 107 can forward the remaining messages received in the network interface 113 from the computer network 114 (e.g., data messages 135) to the storage device 105 without the messages going through the central processing unit 160.

Optionally, the storage product 102 can be configured to limit the access of the central processing unit 160 to processing the messages buffered in the random-access memory 101 by the processing device 107 of the network interface 113 and sending the processed or generated messages (e.g., control messages 137) to the storage device 105.

The storage device 105 can have a host interface 109 configured to communicate on a bus (e.g., interconnect 103) to receive commands and send responses.

For example, the interconnect 103 can have a bus of a same type as the computer bus 125 that connects the bus connector 104 of the storage product 102 and the central processing unit 160. Alternatively, a host interface 112 of the memory sub-system 110 can be used to bridge the computer bus 125 and the interconnect 103.

In some implementations, the host interfaces 112 and 109 can support a same communications protocol. In some implementations, the interconnect 103 is part of, or an extension of, the computer bus 125 connecting the central processing unit 160 to the random-access memory 101 of the storage product 102.

The storage device 105 can have a controller 115 having a local memory 119 and a processing device 117, similar to the memory sub-system controller 115 in FIG. 1. The controller 115 can buffer, in the local memory 119, commands and data received via the host interface 109. The processing device 117 can be configured via instructions and/or logic circuits to execute write commands to store data into the memory devices 130, . . . , 140, to execute read commands to retrieve host data 131, etc.

FIG. 6 shows a storage product configured on a printed circuit board according to one embodiment.

For example, the storage product 102 of FIG. 4 can be implemented in a way illustrated in FIG. 6.

Similar to FIG. 5, the storage product 102 in FIG. 6 has an interconnect 103 connecting a bus connector 104, a processing device 107, a network interface 113, a random-access memory 101, and a storage device 105.

In FIG. 6, the storage product 102 can be configured in the form of an expansion card built on a printed circuit board 108. A portion of the printed circuit board 108 can be configured as the bus connector 104. The bus connector 104 can be inserted into an expansion slot on a computer bus 125 for connection to a central processing unit 160.

In FIG. 6, the memory sub-system 110 has a host interface 112 to bridge the computer bus 125 and the interconnect 103. In some implementations, the interconnect 103 is part of, or an extension of, the computer bus 125, as in FIG. 5.

In FIG. 6, the memory sub-system 110 has a processing device 107 that is separate from the network interface 113. The processing device 107 and the network interface 113 can communicate with each other over the interconnect 103 to process packets to generate messages (e.g., control messages 133 and data messages 135) and to transmit messages (e.g., response messages 155).

In FIG. 6, the processing device 107 (e.g., a processor or controller) can be programmed to perform operations independent of the central processing unit 160. The processing device 107 can place messages (e.g., control messages 133) in the random-access memory 101 for processing by the central processing unit 160, and forward messages (e.g., control messages 137) placed by the central processing unit 160 in the random-access memory 101 to the storage device 105. Thus, the control and access by the central processing unit 160 can be limited to the random-access memory 101.

In some implementations, the processing device 107 and the network interface 113 have a direct communication connection not accessible to other components of the storage product 102. In such implementations, the processing device 107 can be considered part of the network interface 113 as in FIG. 5.

Optionally, the printed circuit board 108 also has a casing or housing 170 configured to substantially enclose the components of the memory sub-system 110 to prevent tampering.

FIG. 5 and FIG. 6 illustrate examples of one storage device 105 being connected to the interconnect 103 of the memory sub-system 110. Optionally, multiple storage devices 105 are configured in the memory sub-system 110 to operate in parallel to match the bandwidth of the network interface 113.

Figure 7:
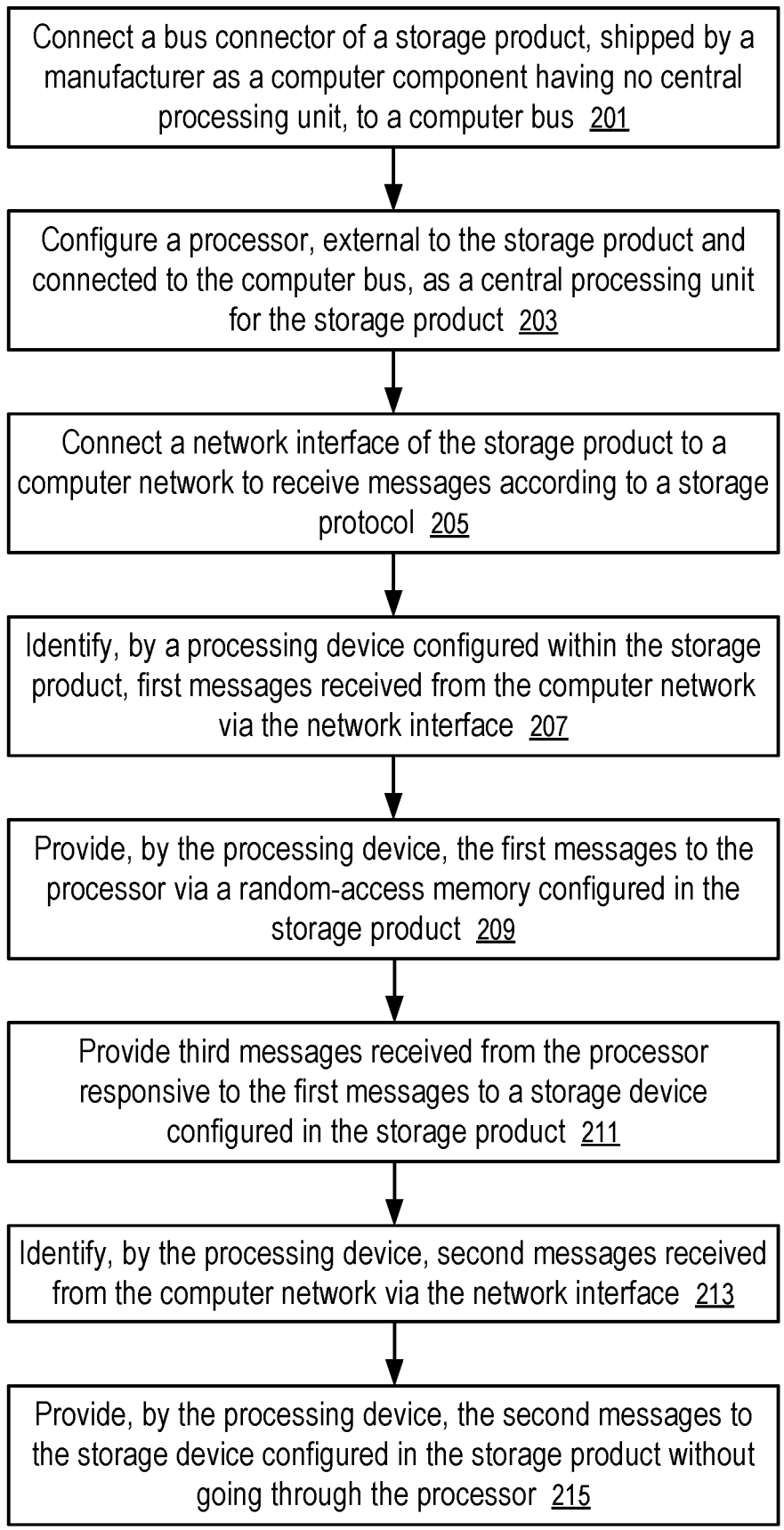
FIG. 7 shows a method to process network messages to access storage of a storage product controlled by an external processor according to one embodiment.

FIG. 7 shows a method to process network messages to access storage of a storage product controlled by an external processor according to one embodiment.

For example, the method of FIG. 7 can be performed by a storage manager configured in a memory sub-system 110 of a storage product 102 and/or a central processing unit 160 of FIG. 4 to FIG. 6 to have different processing paths illustrated in FIG. 2 using a configuration of FIG. 3. For example, a storage manager in the memory sub-system 110 can be implemented to perform operations discussed in connection with the memory sub-system 110; and the storage manager can be implemented via a logic circuit and/or a processing device 117 of the memory sub-system controller 115, and/or instructions programmed to be executed by the processing device 117. For example, a storage manager in the local host system 120 can be implemented to perform operations discussed in connection with the local host system 120; and the storage manager can be implemented via a logic circuit and/or a processing device 118 of the host system 120, and/or instructions programmed to be executed by the processing device 118.

At block 201, a bus connector 104 of a storage product 102, shipped by a manufacturer as a computer component having no central processing unit, is connected to a computer bus 125.

For example, the storage product 102 is manufactured and shipped from a manufacturer as a network-ready computer storage component but has no central processing unit. Thus, the storage product 102 is not operable standalone without an external processor. The storage product 102 includes a random-access memory 101, a network interface 113, a bus connector 104, a processing device 107, and a storage device 105.

The bus connector 104 is connectable to a computer bus 125. A processor (e.g., processing device 118, central processing unit 160, a microprocessor) external to the storage product and connected to the computer bus 125 can operate as a central processing unit 160 for the storage product 102 in providing network storage services.

Controlled by the external processor (e.g., processing device 118, central processing unit 160, a microprocessor), a storage capacity 143 of the storage device 105 in the storage product 102 is accessible via the network interface 113 according to a storage protocol, such as internet small computer systems interface, fibre channel, fibre channel over ethernet, network file system, or server message block, or another protocol.

The bus connector 104 provides the external processor (e.g., processing device 118, central processing unit 160, a microprocessor) with access to the random-access memory 101 in the storage product. Thus, the external processor can control the operations in the storage product 102 at least via retrieving data from and/or writing data into the random-access memory 101.

For example, the storage product 102 can be configured in the form of an expansion card having a printed circuit board 108. A portion of the printed circuit board 108 is configured as the bus connector 104 insertable into an expansion slot on a mother board having a central processing unit 160 installed. Thus, connecting the storage product 102 to the computer bus 125 can be simplified as inserting expansion card into an expansion slot. The components of the storage product 102, such as the random-access memory 101, the network interface 113, the processing device 107, and the storage device 105 are mounted on, and connected to traces configured on, the printed circuit board 108.

In some implementations, the bus connector 104 is a port that accepts a computer cable configured for the computer bus 125.

For example, the storage product 102 can be configured in the form of a solid-state drive or a hard disk drive, an external drive, a network drive, etc. with a housing configured to enclose the components of the storage product 102. Thus, the functions of the random-access memory 101, the storage device 105, the processing device 107, and the network interface 113 in the storage product 102 are inaccessible without using the network port 106 and the bus connector 104.

Optionally, the storage product 102 is powered via power supplied through the network port 106, or the bus connector 104, or any combination thereof. Alternatively, a separate power connector is configured on the storage product 102 to receive power for operations of the components in the storage product 102.

At block 203, a processor (e.g., processing device 118, central processing unit 160, a microprocessor), external to the storage product 102 and connected to the computer bus 125, is configured as a central processing unit 160 for the storage product 102.

For example, the external processor (e.g., processing device 118, central processing unit 160, a microprocessor) can be configured with an operating system and/or a storage application to control the operations in the storage product 102.

At block 205, a network interface 113 of the storage product 102 is connected to a computer network 114 to receive messages according to a storage protocol.

For example, the storage product 102 can have a network port 106 connected to the network interface 113. A network cable can be inserted into the network port 106 for a wired connection to a computer network 114.

In some implementations, the network interface 113 includes a wireless transceiver operable on a wireless computer network 114; and the network port 106 can be a connector for an antenna for the wireless transceiver.

At block 207, a processing device 107 (e.g., a logic circuit, a controller, a processor) configured within the storage product 102 identifies first messages (e.g., control messages 133) received from the computer network 114 via the network interface 113.

In some implementations, the processing device 107 is part of the network interface 113, or having a direct connection with the network interface 113. The processing device 107 is configured to communicate with the random-access memory 101, and the storage device 105. Thus, the network interface 113 does not have a separate connections to the random-access memory 101, and the storage device 105.

In other implementations, the processing device 107 and the network interface 113 are configured to communicate with each other over an interconnect 103 of the storage product 102, such as a computer bus.

The processing device 107 can communicate with the network interface 113 to convert packets received in the network interface 113 into messages based on a storage protocol. The processing device 107 can identify different types of messages and separate the messages for the external processor and the storage devices respectively.

At block 209, the processing device 107 provides the first messages to the processor (e.g., processing device 118, central processing unit 160, a microprocessor) via a random-access memory (e.g., 101 or local memory 119) configured in the storage product 102.

In response to the first messages (e.g., control messages 133), the external processor can provide third messages to the storage product.

At block 211, the third messages (e.g., control messages 137) received from the processor (e.g., processing device 118, central processing unit 160, a microprocessor) responsive to the first messages are provided to a storage device 105 configured in the storage product 102.

For example, the external processor can transmit the third messages (e.g., control messages 137) directly over a connection to the storage device 105. Alternatively, the external processor can store the third messages in the random-access memory 101 for retrieval by the storage device 105 or the processing device 107. When retrieved by the processing device 107, the processing device 107 is configured to forward the retrieved messages (e.g., control messages 137) to the storage device 105.

For example, the storage device 105 can be a solid-state drive operable on the computer bus 125 connected between the storage product 102 and the processor (e.g., processing device 118, central processing unit 160, a microprocessor) external to the storage product 102, or another bus.

At block 213, the processing device 107 identifies second messages (e.g., data messages 135) received from the computer network 114 via the network interface 113.

At block 215, the processing device 107 provides the second messages (e.g., data messages 135) to the storage device 105 configured in the storage product 102 without going through the processor (e.g., processing device 118, central processing unit 160, a microprocessor).

For example, the first messages and the second messages can be identified based on messages types; the first messages are for commands configured for security and administrative operations; and the second messages are for commands configured for read and write operations.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special-purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special-purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a storage manager configured to implement the functions discussed above. In some embodiments, the controller 115 in the memory sub-system 110 includes at least a portion of the storage manager. In other embodiments, or in combination, the controller 116 and/or the processing device 118 in the host system 120 includes at least a portion of the storage manager. For example, the controller 115, the controller 116, and/or the processing device 118 can include logic circuitry implementing the storage manager. For example, the controller 115, or the processing device 118 (processor) of the host system 120, can be configured to execute instructions stored in memory for performing the operations of the storage manager described herein. In some embodiments, the storage manager is implemented in an integrated circuit chip disposed in the memory sub-system 110. In other embodiments, the storage manager can be part of firmware of the memory sub-system 110, an operating system of the host system 120, a device driver, or an application, or any combination therein.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations of a storage manager (e.g., to execute instructions to perform operations corresponding to operations described with reference to FIG. 1-FIG. 7). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory sub-system 110 of FIG. 1.

In one embodiment, the instructions include instructions to implement functionality corresponding to a storage manager (e.g., the operations described with reference to FIG. 1 to FIG. 7). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
    a storage product provided by a manufacturer as a computer component having no central processing unit, the storage product comprising:
        a random-access memory;
        a network interface;
        a bus connector connectable to a computer bus, wherein a processor external to the storage product and connected to the computer bus is operable as a central processing unit for the storage product; and
        a storage device having a storage capacity accessible via the network interface;
    wherein the bus connector is configured to provide the processor with access to the random-access memory;
    wherein the storage product is configured to identify first messages received via the network interface and provide the first messages to the processor via the random-access memory; and
    wherein the storage product is configured to identify second messages received via the network interface and provide the second messages to the storage device without going through the processor.

2. The apparatus of claim 1, wherein the storage product further comprises:
    a printed circuit board, wherein the bus connector is configured as a portion of the printed circuit board and insertable into an expansion slot.

3. The apparatus of claim 2, wherein the random-access memory, the network interface, and the storage device are mounted on and connected to traces configured on the printed circuit board.

4. The apparatus of claim 3, wherein the storage product further comprises a housing configured to enclose the random-access memory, the network interface, and the storage device.

5. The apparatus of claim 3, wherein the storage product further comprises a network port connected to the network interface.

6. The apparatus of claim 3, wherein the network interface includes a wireless transceiver operable on a wireless computer network.

7. The apparatus of claim 3, wherein the storage product further comprises a processing device configured to identify the first messages and the second messages, provide the first messages to the processor external to the storage product, provide the second messages to the storage device of the storage product.

8. The apparatus of claim 7, wherein the storage device is a solid-state drive operable on the computer bus connected between the storage product and the processor external to the storage product.

9. The apparatus of claim 7, wherein the processing device is configured to convert packets received in the network interface into the first messages and the second messages based on a storage protocol according to:
    internet small computer systems interface;
    fibre channel;
    fibre channel over ethernet;
    network file system; or
    server message block.

10. The apparatus of claim 9, wherein the first messages and the second messages are identified based on messages types; and the first messages are configured for security and administrative operations; and the second messages include read commands and write commands.

11. A method, comprising:
    connecting a bus connector of a storage product, shipped by a manufacturer as a computer component having no central processing unit, to a computer bus;
    configuring a processor, external to the storage product and connected to the computer bus, as a central processing unit for the storage product;
    connecting a network interface of the storage product to a computer network to receive messages according to a storage protocol;
    identifying, by a processing device configured within the storage product, first messages received from the computer network via the network interface;
    providing, by the processing device, the first messages to the processor via a random-access memory configured in the storage product;
    providing third messages received from the processor responsive to the first messages to a storage device configured in the storage product;
    identifying, by the processing device, second messages received from the computer network via the network interface; and
    providing, by the processing device, the second messages to the storage device configured in the storage product without going through the processor.

12. The method of claim 11, wherein the storage product further comprises a printed circuit board; the bus connector is configured as a portion of the printed circuit board; and the connecting of the bus connector to the computer bus includes inserting the portion of the printed circuit board as an expansion card into an expansion slot connected to the computer bus.

13. The method of claim 12, further comprising:
mounting the random-access memory, the network interface, and the storage device on the printed circuit board; and
installing a housing enclosing the random-access memory, the network interface, and the storage device.

14. The method of claim 11, further comprising:
inserting a network cable into a network port of the storage product to connect the network interface to the computer network.

15. The method of claim 14, further comprising:
receiving packets from the computer network; and
converting the packets into the first messages and the second messages based on a storage protocol according to:
internet small computer systems interface;
fibre channel;
fibre channel over ethernet;
network file system; or
server message block.

16. The method of claim 15, wherein the first messages and the second messages are identified based on messages types; the first messages are configured for security and administrative operations; and the second messages include read commands and write commands.

17. A computing device, comprising:
a computer bus;
a microprocessor connected to the computer bus as a central processing unit; and
a storage product manufactured as a computer component having no central processing unit, the storage product comprising:
a random-access memory;
a network interface;
a bus connector connected to the computer bus;
a processing device; and
a storage device having a storage capacity accessible via the network interface;
wherein the random-access memory in the storage product is accessible to the microprocessor via the bus connector;
wherein the processing device is configured to identify first messages received via the network interface and provide the first messages to the processor via the random-access memory;
wherein the processing device is configured to identify second messages received via the network interface and provide the second messages to the storage device without going through the processor; and
wherein the microprocessor is configured via instructions programmed to process the first messages, generate third messages and provide the third messages to the storage device in the storage product.

18. The computing device of claim 17, wherein the random-access memory, the storage device, and the processing device in the storage product are configured to be inaccessible without using the network interface and the bus connector.

19. The computing device of claim 18, wherein the storage product further comprises a network port connected to the network interface; and the storage product is powered via power supplied via the network port, or the bus connector, or any combination thereof.

20. The computing device of claim 18, wherein the microprocessor is configured via the instructions to write the third messages to the random-access memory; and the storage device is configured to retrieve the third messages from the random-access memory without assistance from the processing device.

* * * * *